United States Patent
Motegi

[19]

[11] Patent Number: 5,899,680
[45] Date of Patent: May 4, 1999

[54] LOW NITROGEN OXIDES GENERATING COMBUSTION METHOD AND APPARATUS

[75] Inventor: Toru Motegi, Tokyo, Japan

[73] Assignee: Tokyo Gas Co., Ltd., Tokyo, Japan

[21] Appl. No.: 08/748,653

[22] Filed: Nov. 14, 1996

[30] Foreign Application Priority Data

Nov. 16, 1995 [JP] Japan ................................. 7-298241

[51] Int. Cl.$^6$ ................................................. F23C 5/00
[52] U.S. Cl. ........................... 431/8; 431/181; 431/265; 431/354; 239/418; 239/421
[58] Field of Search .................................. 431/265, 181, 431/354, 8; 239/418, 421

[56] References Cited

U.S. PATENT DOCUMENTS 5,486,108   1/1996   Kubota ........................................ 431/8
5,494,437   2/1996   Kubota et al. ........................... 431/181

Primary Examiner—Carroll B. Dority
Attorney, Agent, or Firm—Townsend & Banta

[57] ABSTRACT

The present invention concerns a low nitrogen oxides generating combustion apparatus and a low nitrogen oxides generating combustion method. The apparatus and method of the present invention, the effect of self-induced exhaust gas recirculation can be obtained to the maximum extent, and the lower flame temperature and the lower oxygen concentration assure remarkably low NOx generation.

12 Claims, 9 Drawing Sheets

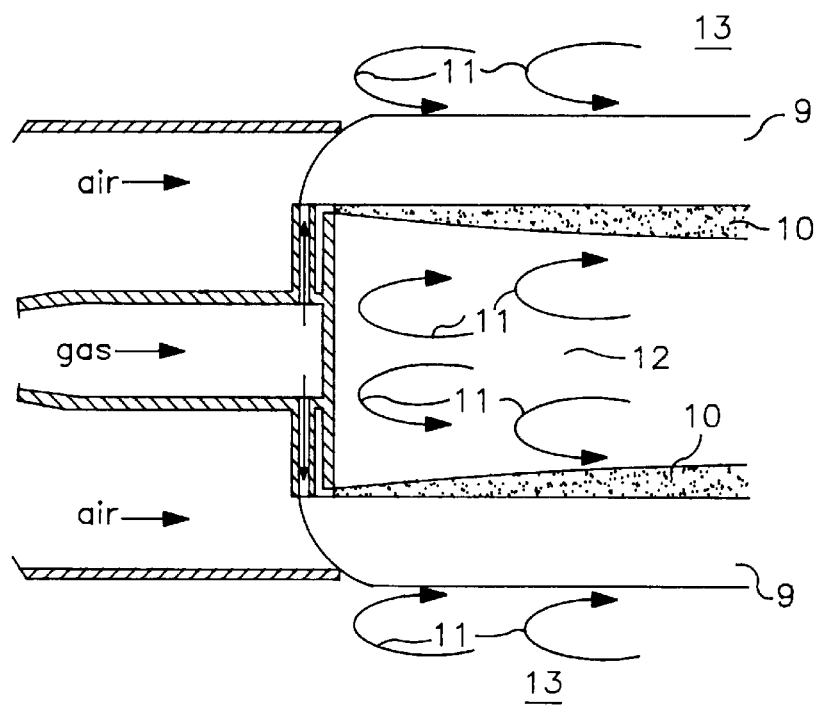
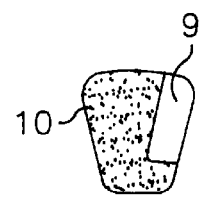
FIG. 7B
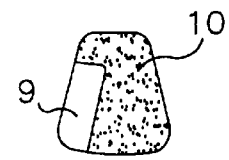
FIG. 7C
FIG. 7A

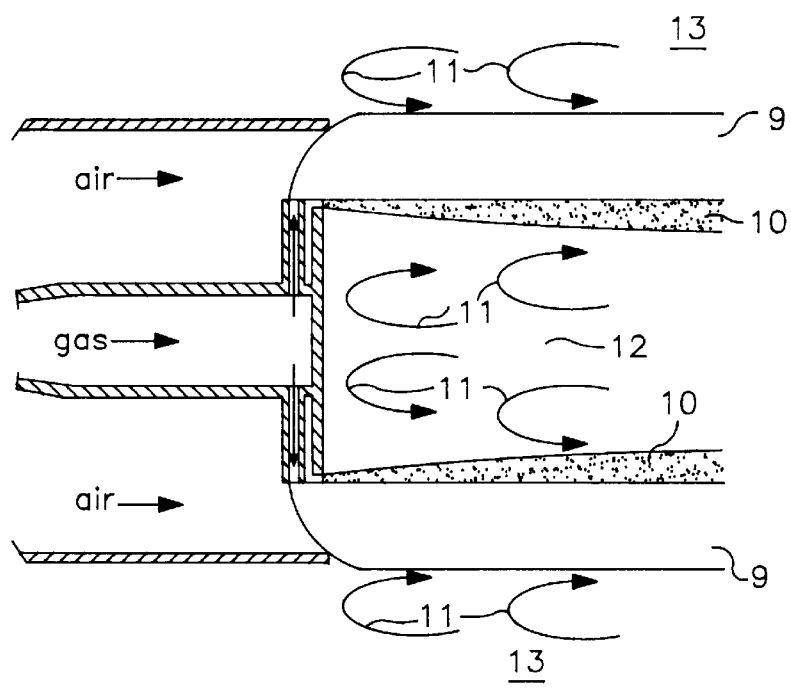
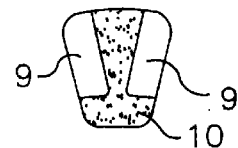
FIG. 8B
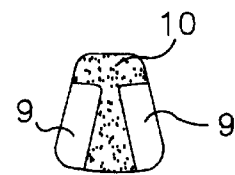
FIG. 8C
FIG. 8A

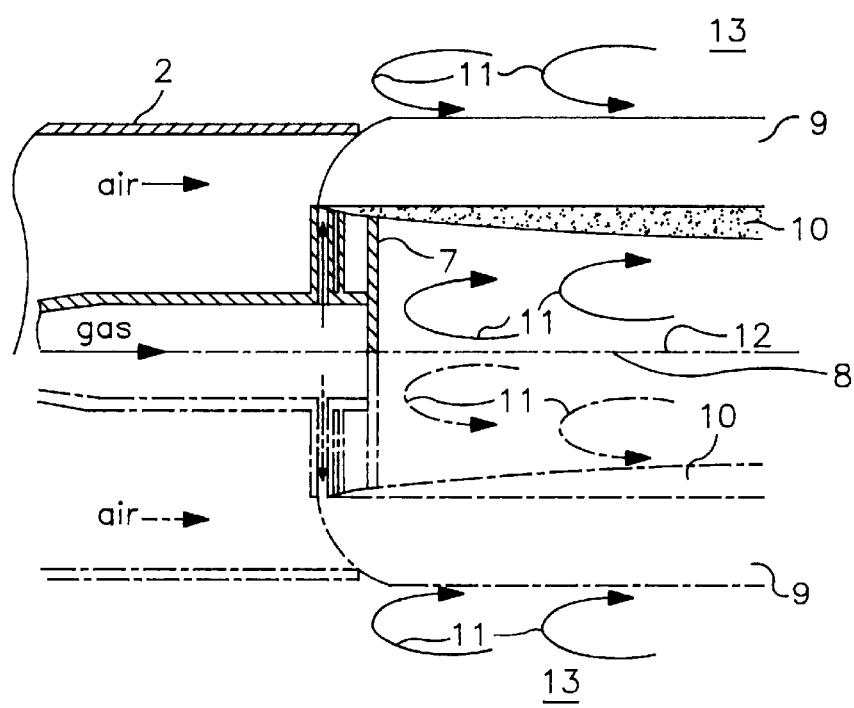
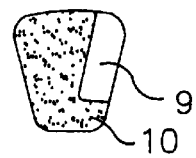
FIG. 9B
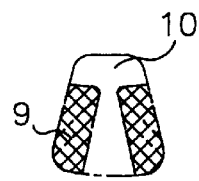
FIG. 9C
FIG. 9A

LOW NITROGEN OXIDES GENERATING COMBUSTION METHOD AND APPARATUS

FIELD OF THE INVENTION

The present invention relates to a low nitrogen oxides generating combustion method and apparatus.

BACKGROUND OF THE INVENTION

The regulations against the emission of NOx caused by combustion are intensified year after year, and very active scientific experimentation has been conducted to decrease NOx emissions. The NOx generated by combustion includes fuel NOx, prompt NOx and thermal NOx. Among these types of NOx, thermal NOx is produced as the nitrogen molecules in combustion air are oxidized in a high temperature atmosphere, and is highly dependent on temperature. At higher combustion temperatures, NOx production increases sharply. Thermal NOx is produced without fail if the combustion gas contains nitrogen molecules, and especially when a hydrocarbon-based fuel is burned, the NOx emitted is mostly thermal NOx. A number of methods for decreasing NOx have been proposed, including multi-stage combustion methods, exhaust gas recirculation methods, lean combustion methods, etc., and it has also been proposed to combine these methods in many ways.

In multi-stage combustion methods, the fuel or combustion air is divided for combustion in two or more stages, which is intended to achieve low NOx combustion by keeping the flame temperature low, or by keeping the oxygen concentration low. The problem here is that the use of these multi-stage combustion methods necessitates the use of a complicated burner.

The exhaust gas recirculation methods are intended to lower the flame temperature or lower the oxygen concentration by mixing part of the combustion gas with the combustion air or fuel, and includes forced exhaust gas recirculation methods and self-induced exhaust gas recirculation methods.

The forced exhaust gas recirculation methods which use a recirculation duct and blower to forcibly mix part of the combustion gas with the combustion air or fuel are the most general methods used. In the self-induced exhaust gas recirculation methods, a specially devised burner is used to let combustion air flow or fuel flow encapture the combustion gas for mixing to achieve the effect of exhaust gas recirculation by the jet entrainment or encapturement. The self-induced exhaust gas recirculation methods have an advantage in that the effect of exhaust gas recirculation can be obtained without forcibly recirculating the combustion gas, and is free from the complication of the multi-stage combustion methods that the fuel or combustion air is divided into a plurality of lines.

A burner using a self-induced exhaust gas recirculation method is disclosed, for example, in Japanese Patent Laid-Open No. 87-17506, and many other burners use the self-induced exhaust gas recirculation methods. However, these methods are limited in the capability to decrease NOx, and further technical development is necessary to meet the latest severe NOx regulations.

Combustion methods developed to maximize the advantage of self-induced exhaust gas recirculation are proposed in Japanese Patent Laid-Open No. 89-300103 and 91-91601, and Japanese Utility Model Laid-Open No. 77-61545. These combustion methods are characterized in that combustion air flow and fuel flow are separately and independently injected into a furnace with a burner without any flame stabilizing mechanism, to maximize the effect of self-induced exhaust gas recirculation.

In this configuration, the flame is not stabilized in the burner, but is formed at a lifted position, and combustion begins after part of the combustion gas in the furnace has been sufficiently entrained or encaptured by the fuel flow or combustion air flow. In these combustion methods, the flame is a gentle diffusion flame, but since there is no flame stabilizing mechanism, stable ignition cannot be achieved without a high temperature. Therefore, even though the methods are suitable for high temperature furnaces such as heating furnaces and melting furnaces, they have problems in that the amount of unburned combustibles increases and a larger furnace must be used for perfect combustion, when they are applied to boilers and low temperature heating furnaces.

Another method for decreasing thermal NOx is to use a premixed flame. Premixed combustion at a high excess air ratio can significantly decrease NOx, but since excessive air increases in the combustion at a high excess air ratio, the efficiencies of combustion and heat transfer greatly decline. Furthermore, the premixed flame is poor in stability.

A method of decreasing thermal Nox by combining the premixed combustion with the effect of self-induced exhaust gas recirculation has been proposed in Japanese Patent Laid-Open No. 91-175211. In this combustion method, a flame specially devised stabilizer is used, and part of the low temperature combustion gas is mixed with a premixture before the premixture initiates combustion, to lower the flame temperature, or to lower the oxygen concentration, for decreasing NOx. This combustion method and apparatus also has problems observed with other premixed type burners, such that an air-fuel mixer is necessary to generate a premixture for premixed combustion. Since a premixture within inflammable limits is used, the flame may go back into the burner or mixer.

Furthermore, there is a problem that since part of the combustion gas is mixed with an inflammable premixture, ignition occurs immediately after the mixing between the premixture and the combustion gas if the mixed combustion gas is high in temperature, barring the effect of self-induced exhaust gas recirculation. Therefore, the flame stabilizer must be specially devised to ensure that the premixture is not ignited when the premixture and part of the combustion gas are mixed.

As described above, self-induced exhaust gas recirculation methods have advantages in that the burner can be simple and low NOx combustion is possible, compared with other low NOx combustion methods such as multi-stage combustion methods and lean premixed combustion methods. In the combustion methods for decreasing thermal NOx by using self-induced exhaust gas recirculation, if the self-induced exhaust gas recirculation is used to the maximum extent for the diffusion flame, the operative temperature range in the furnace is limited, and the usable combustion equipment is also very limited. Moreover, the application of self-induced exhaust gas recirculation to the premixed flame has the problem of flame stability peculiar to the premixed combustion like the back combustion, and disadvantageously requires a more specifically devised flame stabilizer.

SUMMARY OF THE INVENTION

The first embodiment of the present invention provides a low nitrogen oxides generating combustion method, comprising the steps of installing a shielding plate with a plurality of slot-like air injecting portions having bases and base corners around a fuel pipe at the tip of the fuel pipe, in contact with the inside surface of an air pipe; installing base fuel injection pipes which have tips connecting to said fuel pipe as many as said plurality of slot-like air injecting portions which have bases and base corners, at the bases of said plurality of slot-like air injecting portions, in such a way that the tips of the base fuel injection pipes are located alongside the base corners of the air injecting portions, respectively, on one side in a circumferential direction; and installing base fuel injecting portions for injecting the fuel into the air pipe in radial directions, at the tips of the base fuel injection pipes; wherein the fuel injected from said base fuel injecting portions is injected in a direction perpendicular to the air flow just before the air flow is injected from said plurality of slot-like air injecting portions, and the ratio of the air flow velocity at said slot-like air injecting portions to the fuel flow velocity at the base fuel injecting portions is 0.2 or more.

The present invention provides a low nitrogen oxides generating combustion apparatus, comprising a shielding plate with a plurality of slot-like air injecting portions which have bases and base corners, being installed around a fuel pipe, at the tip of the fuel pipe, in contact with the inside surface of an air pipe. Base fuel injection pipes, which have tips, connect to said fuel pipe as many as said plurality of slot-like air injecting portions, which are installed at the bases of said plurality of slot-like air injecting portions, in such a way that the tips of the base fuel injection pipes are located alongside the base corners of the air injecting portions, respectively, on one side in a circumferential direction. The base fuel injecting portions for injecting the fuel into the air pipe in a radial direction, is installed at the tips of the base fuel injection pipes.

The present invention provides a low nitrogen oxides generating combustion method, comprising the steps of installing a shielding plate with a plurality of slot-like air injections, which have bases and base corners, around a fuel pipe, at the tip of the fuel pipe, in contact with the inside surface of an air pipe; installing base fuel injection pipes, which have tips, connecting to said fuel pipe twice as many as said plurality of slot-like air injecting portions, at the bases of said plurality of slot-like air injecting portions, in such a way that the tips of the base fuel injection pipes are located alongside the base corners of the air injecting portions, respectively, on both sides in a circumferential direction; and installing base fuel injecting portions for injecting the fuel into the air pipe in a radial direction, at the tips of the base fuel injection pipes; wherein the fuel injected from said base fuel injecting portions is injected in a direction perpendicular to the air flow just before the air flow is injected from said plurality of slot-like air injecting portions, and the ratio of the air flow velocity at said slot-like air injecting portions to the fuel flow velocity at the base fuel injecting portions is 0.2 or more.

The present invention also provides a low nitrogen oxides generating combustion apparatus, comprising a shielding plate with a plurality of slot-like air injecting portions, which have bases and base corners, being installed around a fuel pipe, at the tip of the fuel pipe, in contact with the inside surface of an air pipe. Base fuel injection pipes, which have tips, connect to said fuel pipe twice as many as said plurality of slot-like air injecting portions, which are installed at the bases of said plurality of slot-like air injecting portions, in such a way that the tips of the base fuel injection pipes are located alongside the base corners of the air injecting portions, respectively, on both sides in a circumferential direction. The base fuel injecting portions for injecting the fuel into the air pipe in a radial direction, are installed at the tips of the base fuel injection pipes.

The present invention also provides a low nitrogen oxides generating combustion method, comprising the steps of installing a shielding plate with a purality of slot-like air injecting portions, around a fuel pipe at the tip of the fuel pipe, in contact with the inside surface of an air pipe; installing base fuel injection pipes connecting to said fuel pipe as many as said plurality of slot-like air injecting portions, at the bases of said plurality of slot-like air injecting portions, in such a way that the tips of the base fuel injection pipes are located alongside the base corners of the air injecting portions, respectively, on one side in a circumferential direction; installing base fuel injecting portions for injecting fuel into the air pipe in a radial direction, at the tips of the base fuel injection pipes, protruding the tip of the fuel pipe from the shielding plate; and installing a disc larger in diameter than the fuel pipe at the tip of the fuel pipe, for forming an exhaust gas recirculation promoting area downstream of the disc; wherein the fuel injected from said base fuel injecting portions is injected in a direction perpendicular to the air flow just before the air flow is injected from said plurality of slot-like air injecting portions. The ratio of the air flow velocity at said slot-like air injecting portions to the fuel flow velocity at the base fuel injecting portions is 0.2 or more.

The present invention further provides a low nitrogen oxides generating combustion apparatus, comprising a shielding plate with a plurality of slot-like air injecting portions, being installed around a fuel pipe at the tip of the fuel pipe, in contact with the inside surface of an air pipe; base fuel injection pipes connecting to said fuel pipe as many as said plurality of slot-like air injecting portions, being installed at the bases of said plurality of slot-like air injecting portions, in such a way that the tips of the base fuel injection pipes are located alongside the base corners of the air injecting portions, respectively, on one side in a circumferential direction. Base fuel injecting portions for injecting the fuel into the air pipe in a radial direction are installed at the tips of the base fuel injection pipes; the tip of the fuel pipe, being protruded from the shielding plate; and a disc larger in diameter than the fuel pipe is installed at the tip of the fuel pipe, for forming an exhaust gas recirculation promoting area downstream of the disc.

The present invention also provides a low nitrogen oxides generating combustion method, comprising the steps of installing a shielding plate with a plurality of slot-like air injecting portions, around a fuel pipe at the tip of the fuel pipe, in contact with the inside surface of an air pipe; installing base fuel injection pipes connecting to said fuel pipe twice as many as said plurality of slot-like air injecting portions, at the bases of said plurality of slot-like air injecting portions, in such a way that the tips of the base fuel injection pipes are located alongside the base corners of the air injecting portions, respectively, on both sides in a circumferential direction; installing base fuel injecting portions for injecting the fuel into the air pipe in a radial direction, at the tips of the base fuel injection pipes. Protruding the tip of the fuel pipe from the shielding plate and installing a disc larger in diameter than the fuel pipe at the tip of the fuel pipe, for forming an exhaust gas recirculation promoting area downstream of the disc; wherein the fuel injected from said base fuel injecting portions is injected in a direction perpendicular to the air flow just before the air flow is injected from said purality of slot-like air injecting portions. The ratio of the air flow velocity at said slot-like air injecting portions to the fuel flow velocity at the base fuel injecting portions is 0.2 or more.

The present invention further provides a low nitrogen oxides generating combustion apparatus, comprising a shielding plate with a plurality of slot-like air injecting portions, being installed around a fuel pipe at the tip of the fuel pipe, in contact with the inside surface of an air pipe; base fuel injection pipes connecting to said fuel pipe twice as many as said plurality of slot-like air injecting portions, being installed at the bases of said plurality of slot-like air injecting portions, in such a way that the tips of the base fuel injection pipes are located alongside the base corners of the air injecting portions, respectively, on both sides in a circumferential direction. Base fuel injecting portions for injecting the fuel into the air pipe in radial directions are installed at the tips of the base fuel injection pipes; the tip of the fuel pipe, being protruded from the shielding plate. A disc larger in diameter than the fuel pipe is installed at the tip of the fuel pipe, for forming an exhaust gas recirculation promoting area downstream of the disc.

The present invention provides a low nitrogen oxides generating combustion method wherein oxygen enriched air of 21 vol % or more in oxygen concentration is used as the combustion air which is introduced into the air pipe.

BRIEF DESCRIPTION OF THE DRAWINGS

FIG. 7A is an illustration showing a state where the combustion gas, air and furnace gas are mixed, and the fuel gas flow is formed around the periphery of the air flow.

FIG. 7B is a front view of the mixture of fuel gas and air flow formed in the apparatus shown in FIG. 7A.

FIG. 7C is another front view of the mixture of fuel gas and air flow formed in the apparatus shown in FIG. 7A.

FIG. 8A is another illustration showing a state where the combustion gas, air and furnace gas are mixed, and the fuel gas formed around the air flow.

FIG. 8B is a front view of the mixture of fuel gas and air flow formed in the apparatus shown in FIG. 8A.

FIG. 8C is another front view of the mixture of fuel gas and air flow formed in the apparatus shown in FIG. 8A.

FIG. 9A is an illustration showing a state where the combustion gas, air and furnace gas are mixed and the disc 7 is installed.

FIG. 9B is a front view of the mixture of fuel gas and air flow formed in the apparatus shown in FIG. 9A.

FIG. 9C is another front view of the mixture of fuel gas and air flow formed in the apparatus shown in FIG. 9A.

MEANING OF SYMBOLS

Figure 1C:
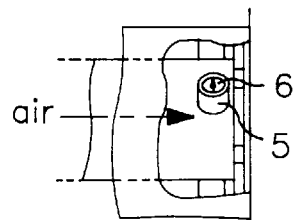
FIG. 1C is a side view partially cut away of the apparatus of the present invention, showing the base fuel injection pipes and the base fuel injecting portions.

1 Fuel pipe
2 Air pipe
3 Slot-like air injecting portions
4 Shielding plate
5 Base fuel injection pipe
6 Base fuel injecting portion
7 Disc
8 Internal recirculating promoting area
9 Fuel gas flow
10 Air flow
11 Furnace gas flow
12 Internal recirculation area
13 External recirculation area
14 Eddy currents

DETAILED DESCRIPTION OF THE INVENTION

Air is injected from slot-like air injecting portions 3, and into the air flow 10 just before the air is injected from the slot-like air injecting portions 3, a fuel is injected in a direction perpendicular to the air flow 10, into the spaces immediately upstream of the base corners of the air injecting portions, respectively, on one side or both sides in a circumferential direction, so that diffusion flames may be formed with the fuel surrounded by air, and burned without being stabilized at the air injecting portions or fuel injecting portions, to ensure that part of the combustion gas may be entrained by the air flow 10 and the fuel flow 9 before the diffusion flames are formed, to effectively achieve the self-induced exhaust gas recirculation, for decreasing NOx.

Figure 1B:
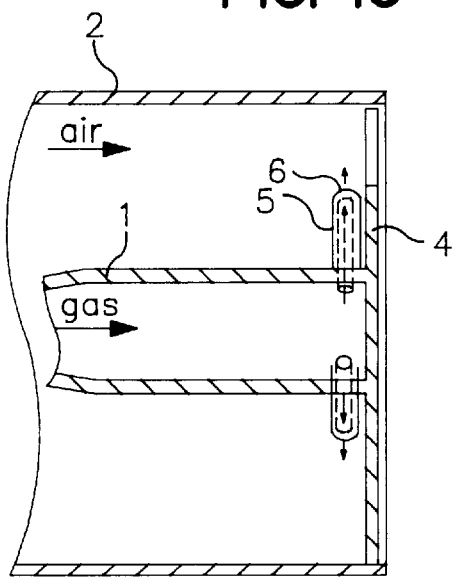
FIG. 1B is a cross sectional view of the apparatus of present invention, illustrating a shielding plate with a plurality of air injecting portions.
Figure 1A:
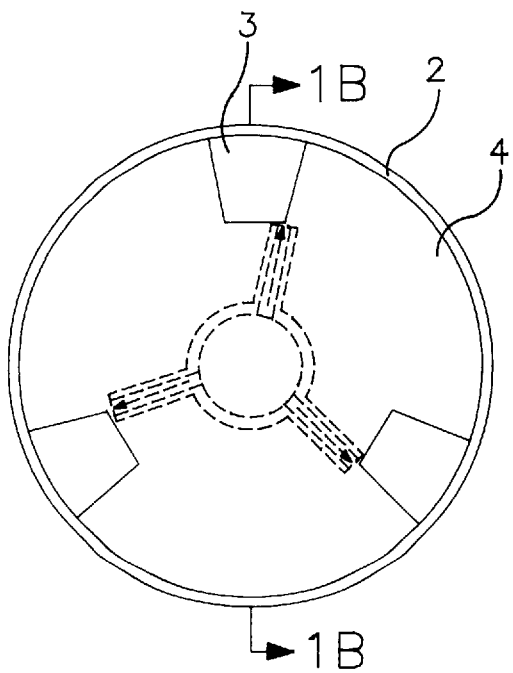
FIG. 1A is a front view of an air pipe of the apparatus of the present invention shown in FIG. 2B.

In FIG. 1, symbol 1 denotes a fuel pipe, and at the tip of the fuel pipe 1, a shielding plate 4 with a plurality of slot-like air injecting portions 3 is installed around the fuel pipe 1 and in contact with the inside surface of an air pipe 2. At the base of the plurality of slot-like injecting portions 3, base fuel injection pipes 5 connect to the fuel pipe 1 as many of said plurality of slot-like injecting portions 3 as are provided with their tips located alongside the base corners of the slot-like air injecting portions 3, respectively, on one side in a circumferential direction. At the tips of the base fuel injection pipes 5, base fuel injecting portions 6 for injecting the fuel in a radial direction are provided.

Figure 2C:
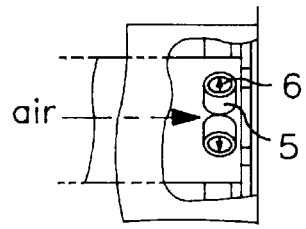
FIG. 2C is a side view partially cut away of the apparatus of the present invention shown in FIG. 2B, showing the base fuel injection pipes and the base fuel injecting portions.
Figure 2B:
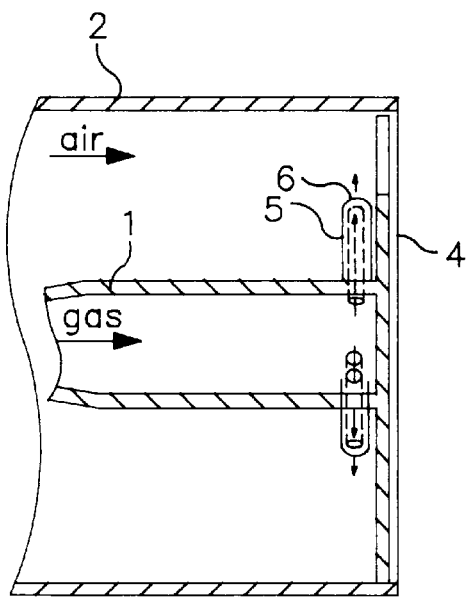
FIG. 2B is a cross sectional view of the apparatus of present invention, illustrating the use of a plurality of base fuel injection pipes.
Figure 2A:
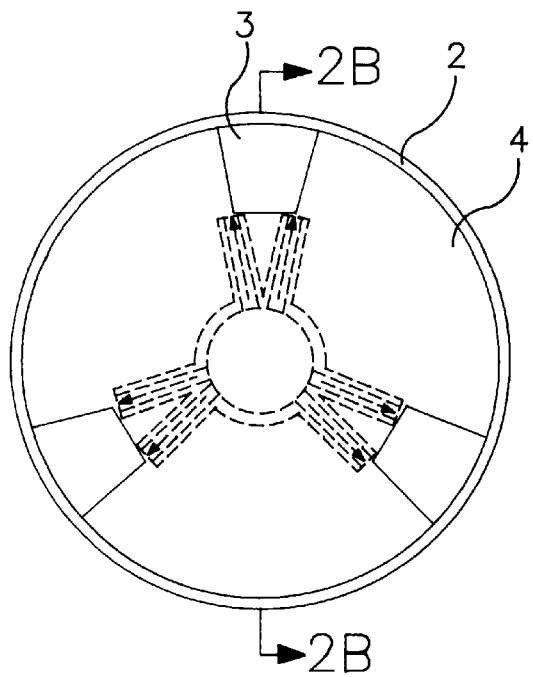
FIG. 2A is a front view of an air pipe of the apparatus of the present invention shown in FIG. 2B.

In FIG. 2, the base fuel injection pipes 5 (twice as many as said plurality of slot-like injecting portions 3) are provided with their tips located alongside the base corners of the slot-like air injecting portions 3, respectively, on both sides in a circumferential direction.

Figure 3C:
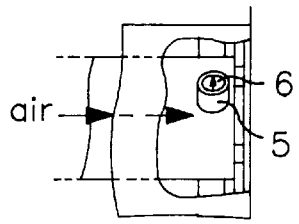
FIG. 3C is a side view partially cut away of the apparatus of the present invention shown in FIG. 3B, showing the base fuel injection pipes and the base fuel injecting portions.
Figure 3B:
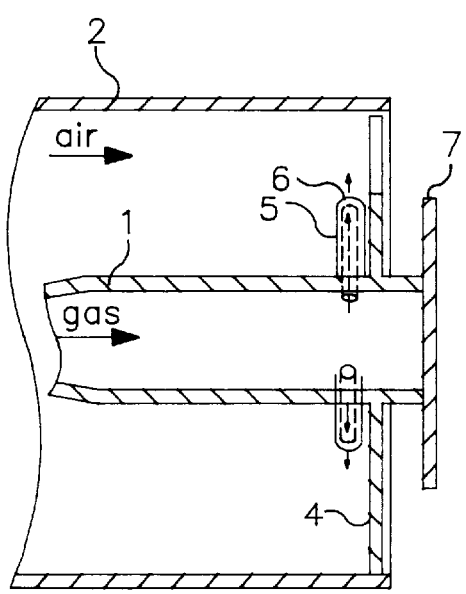
FIG. 3B is a cross sectional view of the apparatus of the present invention, illustrating the use of a disc larger in diameter than the fuel pipe which is installed at the tip of the fuel pipe.
Figure 3A:
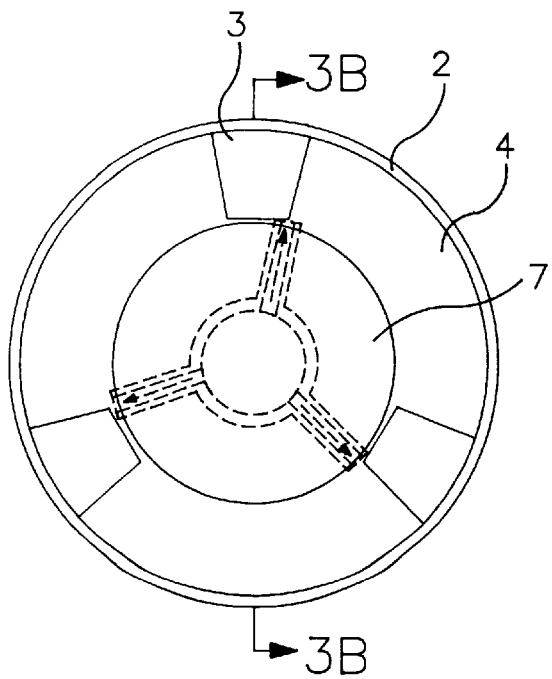
FIG. 3A is a front view of an air pipe of the apparatus of the present invention shown in FIG. 3B.
Figure 4C:
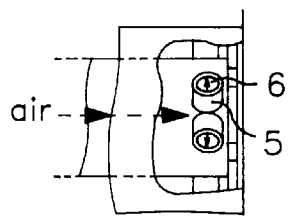
FIG. 4C is a side view partially cut away of the apparatus of the present invention shown in FIG. 4B, showing the base fuel injection pipes and the base fuel injecting portions.
Figure 4B:
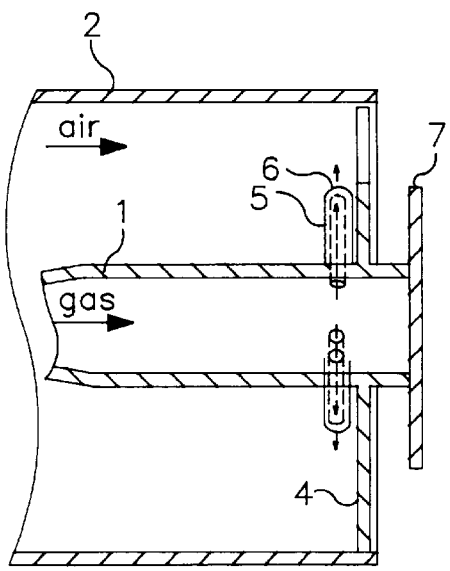
FIG. 4B is a cross sectional view of the apparatus of the FIG. 3, illustrating the use of a plurality of base fuel injection pipes.
Figure 4A:
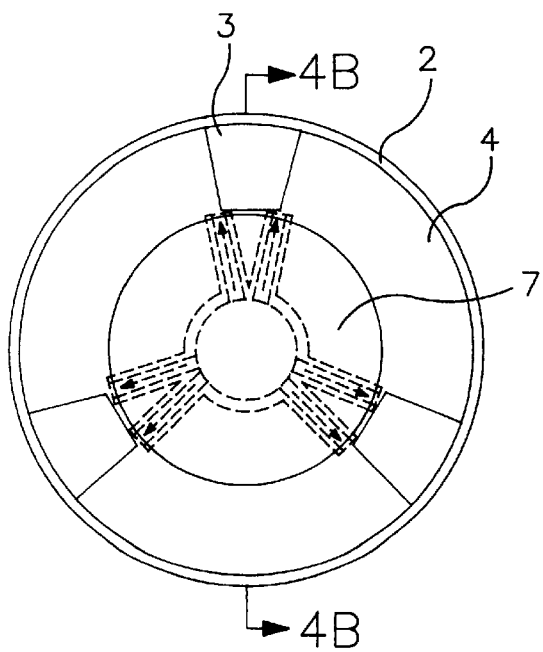
FIG. 4A is a front view of an air pipe of the apparatus of the present invention shown in FIG. 4B.

In FIGS. 3 and 4, the fuel pipe 1 is protruded from the shielding plate 4, and a disc 7 larger in diameter than the fuel pipe 1 is installed at the tip of the fuel pipe 1, in order that a self-induced exhaust gas recirculation promoting area 8 may be formed downstream of the disc 7 as shown in FIG. 9.

In this configuration, air is injected from the slot-like air injecting portions 3, and into the air flow just before the air is injected from the slot-like air injecting portions 3, the fuel gas is injected from the base fuel injecting portions 6 in a direction perpendicular to the air flow, into the spaces immediately upstream of the base corners of the air injecting portions 3, respectively, on one side or both sides in a circumferential direction.

Figure 5:
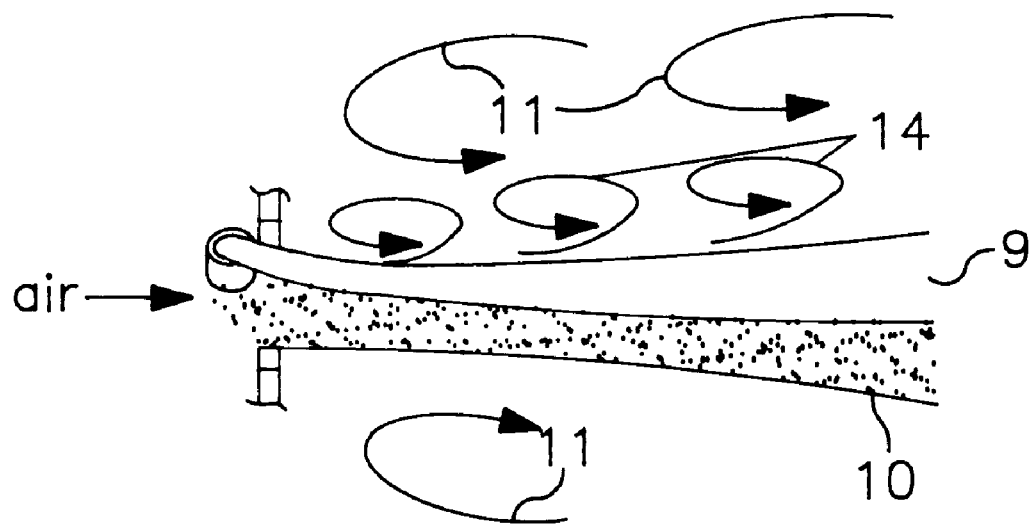
FIG. 5 is an illustration showing a state where the combustion gas, air and furnace gas are mixed, and the eddy currents formed along side the main gas flow.
Figure 6:
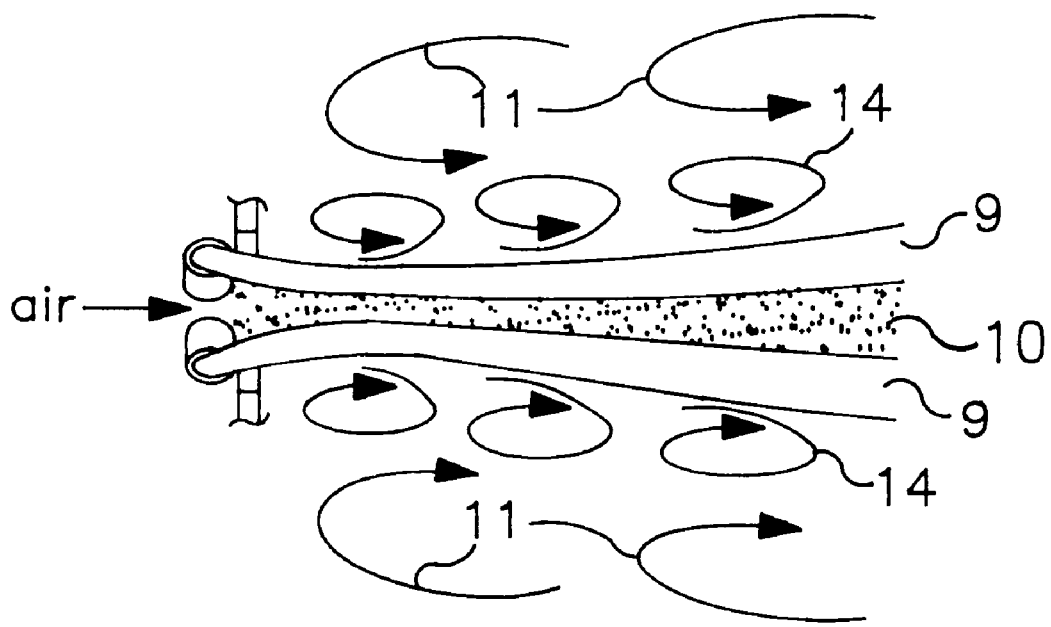
FIG. 6 is another illustration showing a state where combustion gas, air and furnace gas are mixed, and eddy currents formed along side the main gas flow.

In this case, the ratio of the air flow velocity at the slot-like air injecting portions 3 to the fuel gas flow velocity at the base fuel injecting portions 6 must be set at 0.2 or more, practically 0.2 to about 5. If the ratio is less than 0.2, the fuel gas goes through the air flow, to collide with the inside wall of the air pipe 2, being diffused, and flames stabilized in the air pipe 2 are formed. So, the ratio cannot be set at less than 0.2. If the ratio is set as specified above, diffusion flames not stabilized at the slot-like air injecting portions 3 are formed, and the fuel gas flow 9 injected in the direction perpendicular to the air flow on one side or both sides of each of the slot-like air injecting portions 3 is formed on one side or both sides of air flow 10, with powerful eddy currents 14 alongside the fuel gas flow 9, as shown in FIGS. 5 and 6. That is, as shown in FIGS. 7 and 8, the fuel gas flow 9 is formed around the periphery of the air flow 10, and furnace gas flow 11 is formed to be entrained by the air flow 10 outside the air flow 10 as shown by arrows. For the air flow 10, the high temperature furnace gas flow 11 is diffused and mixed from outside, and simultaneously, the fuel gas flow 9 is diffused and mixed internally.

In the case of ordinary diffusion flames, since flames are formed and stabilized at air injection holes or fuel gas injection holes, combustion begins before the air flow entrains the surrounding furnace gas. However, in the present invention, since the flow velocity ratio is set as specified above, the flames are not stabilized at the slot-like air injecting portions 3 or the base fuel injection portions 6. In the present invention, the air flow 10 is mixed with the furnace gas flow 11 while being heated, and at the same time, it is gradually mixed with the fuel gas flow 9 streaming along the air flow 10. The three components develop a favorable mixing state, and when the temperature, fuel concentration and oxygen concentration satisfy the ignition condition, combustion is initiated to form the diffusion flames. In these diffusion flames, since part of the combustion gas is sufficiently mixed with the combustion air, or furthermore the fuel flow before the combustion is initiated, the effect of self-induced exhaust gas recirculation can be obtained to the maximum extent, and the lower flame temperature and the lower oxygen concentration assure remarkably low NOx generation. In this case, an internal recirculation area 12 and an external recirculation area 13 contribute greatly to the entrainment of a large quantity of the furnace gas flow 11.

The fuel injected in the direction perpendicular to the air flow 10 into the spaces immediately upstream of the base corners of the slow-like air injecting portions 3, respectively, one side or both sides in circumferential directions is partially entrained by the negative pressure area formed downstream of the shielding plate 4 by the air jets, to form eddy currents 14. The fuel flow 9 forming the eddy currents 14 is mixed with the air flow 10, and also partially gradually mixed with the furnace gas flow 11 entrained by the air flow 10. When the combustion gas is entrained by an amount enough to ignite the fuel, the fuel initiates combustion. The eddy currents 14 assure stable ignition of the flames even if the flames are not stabilized at the slot-like air injecting portions 3 or the base fuel injecting portions 6. If the flow velocity ratio of the combustion air flow to the fuel flow is 0.2 or more when the fuel is injected in a direction perpendicular to the air flow 10 just before it is injected from the slot-like air injecting portions 3, the flames are formed without being stabilized at the injecting portions, to be low in NOx content as described above.

The shielding plate 4 provided around the fuel pipe 1 at the tip of the fuel pipe 1 in the air pipe 2 and in contact with the inside wall of the air pipe 2 has a slot-like air injecting portions 3, and air for combustion is injected from the slot-like air injecting portions 3. Therefore, the area of jets can be kept large, and the combustion gas around the air can be efficiently entrained. Furthermore, since a plurality of slot-like air injecting portions 3 are formed, the air flow 10 is injected separately, and the respective jets entrain the furnace gas flow 11. Compared to a burner with one air jet, the combustion gas around the air flow can be efficiently entrained, to enhance the effect of self-induced exhaust gas recirculation. In the portions surrounded by the plurality of combustion air jets, the internal recirculation area 12 is formed, and around the plurality of combustion air jets, the external recirculation area 13 is formed.

In both the recirculation areas, part of the combustion gas is recirculated and entrained by the combustion air jets. Especially in the internal recirculation area 12, high temperature combustion gas is recirculated, and hence the diffusion flames not stabilized at any portions can be ignited and formed stably.

FIGS. 3, 4 and 9 show a case where a disc 7 is also installed. In this case, as shown in the drawings, a selfinduced exhaust gas recirculation promoting area 8 is formed downstream of the disc 7, to expand the internal recirculation area 12, thereby remarkably increasing the quantity of the exhaust gas recirculated, to give a further higher effect in the decrease of NOx. The disc plate 7 inhibits the expansion of the air flow 10 into the internal recirculation area 12 of high temperature, to increase the quantity of self-induced exhaust gas recirculation. The increase of entrained flow remarkably promotes the effect of decreasing NOx.

In the above combustion, if the combustion air introduced into the air pipe 2 is the oxygen enriched air containing more than 21 vol % of oxygen, the combustion quantity can be increased, while the low NOx combustion is sustained.

Figure 10:
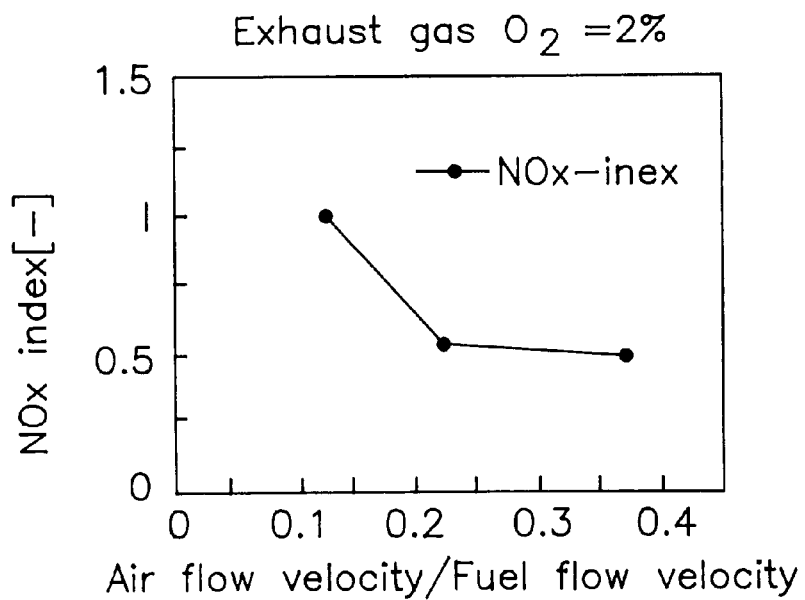
FIG. 10 is a diagram showing the NOx decrease effected by the present invention.

FIG. 10 shows the NOx decrease effect of the present invention. From the diagram, it can be seen that if the air/fuel flow velocity ratio is 0.2 or more, NOx can be remarkably decreased.

Figure 11:
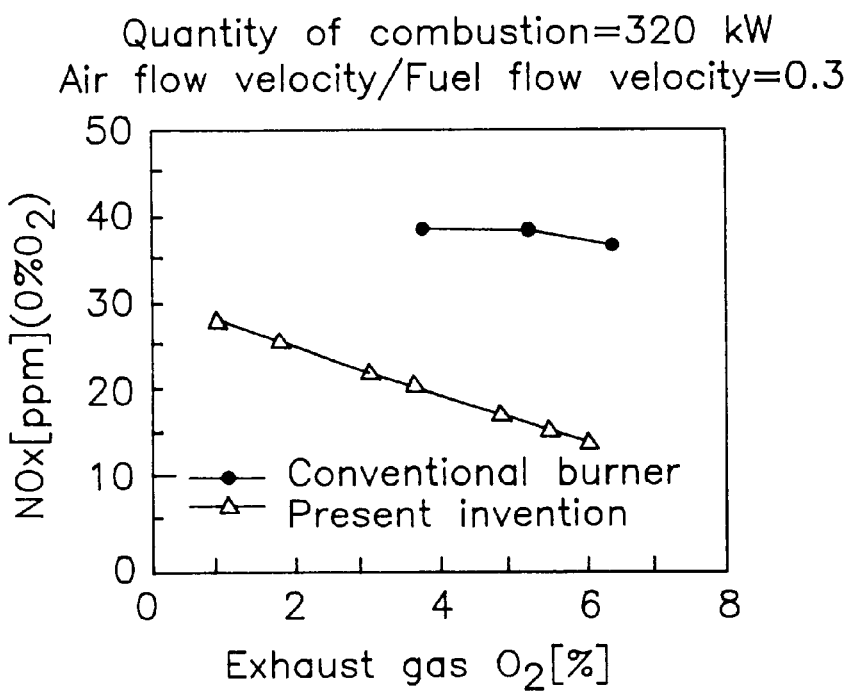
FIG. 11 is a diagram showing the NOx decrease effect of the present invention in comparison with a conventional example.

FIG. 11 shows the NOx decrease effect of the present invention. From the diagram, it can be seen that if the air/fuel flow velocity ratio is 0.2 or more, NOx can be remarkably decreased, compared with a conventional example.

The present invention can remarkably inhibit the generation of NOx, solving at once the conventional problems by using the low NOx combustion method and apparatus described above.

What is claimed is:

1. A low nitrogen oxides generating combustion method, comprising the steps of:

installing a shielding plate with a plurality of slot-like air injecting portions having bases and base corners, around a fuel pipe having a tip at the tip of the fuel pipe and in contact with an inside surface of an air pipe which surrounds said fuel pipe;

installing base fuel injection pipes having tips connecting to said fuel pipe at each of said plurality of slot-like air injecting portions, at the bases of said plurality of slot-like air injecting portions, in such a way that the tips of the base fuel injection pipes are located alongside said base corners of the air injecting portion, respectively, on one side in a circumferential direction; and installing base fuel injecting portions for injecting the fuel into said air pipe in radial directions, at the tips of the base fuel injection pipes;

wherein the fuel injected from said base fuel injecting portions is injected in a direction perpendicular to the air flow just before the air flow is injected from said plurality of slot-like air injecting portions, and the ratio of the air flow velocity at said slot-like air injecting portions to the fuel flow velocity at the base fuel injecting portions is 0.2 or more.

2. A low nitrogen oxides generating combustion apparatus, comprising:

a shielding plate with a plurality of slot-like air injecting portions having bases and base corners, being installed around a fuel pipe having a tip at the tip of the fuel pipe, in contact with the inside surface of an air pipe;

base fuel injection pipes having tips connecting to said fuel pipe at each of said plurality of slot-like air injecting portions, being installed at the bases of said plurality of slot-like air injecting portions, in such a way that the tips of the base fuel injection pipes are located alongside the base corners of the air injecting portions, respectively, on one side in a circumferential direction;

and base fuel injecting portions for injecting the fuel into the air pipe in a radial direction, being installed at the tips of the base fuel injection pipes.

3. A low nitrogen oxides generating combustion method, comprising the steps of:

installing a shielding plate with a plurality of slot-like air injecting portions having bases and base corners, around a fuel pipe having a tip at the tip of the fuel pipe, in contact with the inside surface of an air pipe surrounding said fuel pipe;

installing base fuel injection pipes having tips connecting to said fuel pipe twice as many as said plurality of slot-like air injecting portions, at the bases of said plurality of slot-like air injecting portions, in such a way that the tips of the base fuel injection pipes are located alongside the base corners of the air injecting portions, respectively, on both sides in a circumferential direction;

and installing base fuel injecting portions for injecting the fuel into the air pipe in a radial direction, at the tips of the base fuel injection pipes;

wherein the fuel injected from said base fuel injecting portions is injected in a direction perpendicular to the air flow just before the air flow is injected from said plurality of slot-like air injecting portions, and the ratio of the air flow velocity at said slot-like air injecting portions to the fuel flow velocity at the base fuel injecting portions is 0.2 or more.

4. A low nitrogen oxides generating combustion apparatus, comprising:

a shielding plate with a plurality of slot-like air injecting portions having bases and base corners, being installed around a fuel pipe having a tip at the tip of the fuel pipe, in contact with the inside surface of an air pipe;

base fuel injection pipes having tips connecting to said fuel pipe with twice as many as said plurality of slot-like air injecting portions, being installed at the bases of said plurality of slot-like air injecting portions, in such a way that the tips of the base fuel injection pipes are located alongside the base corners of the air injecting portions, respectively, on both sides in a circumferential direction;

and base fuel injecting portions for injecting the fuel into the air pipe in a radial direction, being installed at the tips of the base fuel injection pipes.

5. A low nitrogen oxides generating combustion method, comprising the steps of:

installing a shielding plate with a plurality of slot-like air injecting portions having bases and base corners, around a fuel pipe having a tip at the tip of the fuel pipe, in contact with the inside surface of an air pipe surrounding said fuel pipe;

installing base fuel injection pipes having tips connecting to said fuel pipe at each of said plurality of slot-like air injecting portions, at the bases of said plurality of slot-like air injecting portions, in such a way that the tips of the base fuel injection pipes are located alongside the base corners of the air injecting portions, respectively, on one side in a circumferential direction;

installing base fuel injecting portions for injecting the fuel into the air pipe in a radial direction, at the tips of the base fuel injection pipes;

protruding the tip of the fuel pipe from the shielding plate; and installing a disc larger in diameter than the fuel pipe at the tip of the fuel pipe, for forming an exhaust gas recirculation promoting area downstream of the disc;

wherein the fuel injected from said base fuel injecting portions is injected in a direction perpendicular to air flow just before the air flow is injected from said plurality of slot-like air injecting portions, and the ratio of the air flow velocity at said slot-like air injecting portions to the fuel flow velocity at the base fuel injecting portions is 0.2 or more.

6. A low nitrogen oxides generating combustion apparatus, comprising:

a shielding plate with a plurality of slot-like air injecting portions having bases and base corners, being installed around a fuel pipe having a tip at the tip of the fuel pipe, in contact with the inside surface of an air pipe, base fuel injection pipes having tips connecting to said fuel pipe at each of said plurality of slot-like air injecting portions, being installed at the bases of said plurality of slot-like air injecting portions, in such a way that the tips of the base fuel injection pipes are located alongside the base corners of the air injecting portions, respectively, on one side in circumferential direction;

base fuel injecting portions for injecting the fuel into the air pipe in a radial direction, being installed at the tips of the base fuel injection pipes;

the tip of the fuel pipe, being protruded from the shielding plate;

and a disc larger in diameter than the fuel pipe, being installed at the tip of the fuel pipe, for forming an exhaust gas recirculation promoting area downstream of the disc.

7. A low nitrogen oxides generating combustion method, comprising the steps of:

installing a shielding plate with a plurality of slot-like air injecting portions having bases and base corners, around a fuel pipe having a tip at the tip of the fuel pipe, in contact with the inside surface of an air pipe;

installing base fuel injection pipes having tips connecting to said fuel pipe at twice as many as said plurality of slot-like air injecting portions, at the bases of said plurality of slot-like air injecting portions, in such a way that the tips of the base fuel injection pipes are located alongside the base corners of the air injecting portions, respectively, on both sides in a circumferential direction;

installing base fuel injecting portions for injecting the fuel into the air pipe in a radial direction, at the tips of the base fuel injection pipes;

protruding the tip of the fuel pipe from the shielding plate; and installing a disc larger in diameter than the fuel pipe at the tip of the fuel pipe, for forming an exhaust gas recirculation promoting area downstream of the disc;

wherein the fuel injected from said base fuel injecting portions is injected in a direction perpendicular to the air flow just before the air flow is injected from said plurality of slot-like air injecting portions, and the ratio of the air flow velocity at said slot-like air injecting portions to the fuel flow velocity at the base fuel injecting portions is 0.2 or more.

8. A low nitrogen oxides generating combustion apparatus, comprising:

a shielding plate with a plurality of slot-like air injecting portions having bases and base corners, being installed around a fuel pipe having a tip at the tip of the fuel pipe, in contact with the inside surface of an air pipe;

base fuel injection pipes having tips connecting to said fuel pipe at twice as many as said plurality of slot-like air injecting portions, being installed at the bases of said plurality of slot-like air injecting portions, in such a way that the tips of the base fuel injection pipes are located alongside the base corners of the air injecting portions respectively on both sides in a circumferential direction;

base fuel injecting portions for injecting the fuel into the air pipe in a radial direction, being installed at the tips of the base fuel injection pipes;

the tip of the fuel pipe, being protruded from the shielding plate;

and a disc larger in diameter than the fuel pipe, being installed at the tip of the fuel pipe, for forming an exhaust gas recirculation promoting area downstream of the disc.

9. A low nitrogen oxides generating combustion method, according to claim 1, wherein oxygen enriched air of 21 vol% or more in oxygen concentration is used as the combustion air to be introduced into the air pipe.

10. A low nitrogen oxides generating combustion method, according to claim 3, wherein oxygen enriched air of 21 vol % or more in oxygen concentration is used as the combustion air to be introduced into the air pipe.

11. A low nitrogen oxides generating combustion method, according to claim 5, wherein oxygen enriched air of 21 vol % or more in oxygen concentration is used as the combustion air to be introduced into the air pipe.

12. A low nitrogen oxides generating combustion method, according to claim 7, wherein oxygen enriched air of 21 vol % or more in oxygen concentration is used as the combustion air to be introduced into the air pipe.

* * * * *